(12) United States Patent
Cioffi et al.

(10) Patent No.: US 11,880,730 B1
(45) Date of Patent: Jan. 23, 2024

(54) RADIO-FREQUENCY COMMUNICATION-ENABLED FABRICS AND RELATED METHODS

(71) Applicant: Smart Technology Device Integration, LLC, Orlando, FL (US)

(72) Inventors: Antonio Cioffi, Orlando, FL (US); Jhonathan Graffe, Orlando, FL (US); Yvan Barberan, Orlando, FL (US)

(73) Assignee: Smart Technology Device Integration, LLC, Orlando, FL (US)

( * ) Notice: Subject to any disclaimer, the term of this patent is extended or adjusted under 35 U.S.C. 154(b) by 0 days.

(21) Appl. No.: 17/694,510

(22) Filed: Mar. 14, 2022

Related U.S. Application Data

(60) Provisional application No. 63/160,334, filed on Mar. 12, 2021.

(51) Int. Cl.
*G06K 19/02* (2006.01)
*G06K 19/07* (2006.01)
*G06K 19/077* (2006.01)

(52) U.S. Cl.
CPC ....... *G06K 19/027* (2013.01); *G06K 19/0723* (2013.01); *G06K 19/07762* (2013.01); *G06K 19/07773* (2013.01)

(58) Field of Classification Search
CPC ........... G06K 19/027; G06K 19/07758; G06K 19/0776; G06K 19/07762; G08B 13/2434;
(Continued)

(56) References Cited

U.S. PATENT DOCUMENTS

| 5,785,181 A | 7/1998 | Quartararo, Jr. |
| 8,936,197 B2 | 1/2015 | Tiedmann et al. |

(Continued)

FOREIGN PATENT DOCUMENTS

| EP | 2405054 B1 | 2/2013 |
| GB | 2520053 | 5/2015 |

(Continued)

OTHER PUBLICATIONS

Machine translation of KR-101753142, retrieved from KIPO, retrieved Dec. 16, 2022 (Year: 2022).*

(Continued)

*Primary Examiner* — Suezu Ellis
(74) *Attorney, Agent, or Firm* — Allen, Dyer, Doppelt & Gilchrist, P.A.

(57) ABSTRACT

A RFID tag configured with a Near Field Communication (NFC) protocol is sealed between water-resistant layers and affixed to a fabric. The NFC-configured tag can be programmed with instructions to automatically direct an electronic device to a web address by which means virtually any additional information can be communicated to the user of the electronic device. According to a method aspect, the NFC-configured tag is initially sealed between water-resistant layers. A compatible water-resistant layer is affixed to a fabric and then the sealed NFC-configured tag and a further water-resistant cover layer are affixed to the fabric over the previously-affixed compatible layer. The tag is then securely and permanently affixed to the fabric, with which the tag can be safely subjected to repeated wear and washing.

18 Claims, 5 Drawing Sheets

(58) Field of Classification Search
CPC ............ G08B 13/2437; G08B 13/2442; G08B 13/2445
USPC .............................. 235/492; 340/572.1, 572.8
See application file for complete search history.

(56) References Cited

U.S. PATENT DOCUMENTS

| | | | |
|---|---|---|---|
| 9,064,197 | B2 | 6/2015 | Tiedmann et al. |
| 9,129,203 | B2 | 9/2015 | Ishida et al. |
| 9,818,056 | B2 | 11/2017 | Forster |
| 10,534,988 | B2 | 1/2020 | Bauer et al. |
| 2005/0183990 | A1 | 8/2005 | Corbett |
| 2009/0100575 | A1 | 4/2009 | Darnborough |
| 2010/0059595 | A1 | 3/2010 | Longfu |
| 2018/0088627 | A1* | 3/2018 | Cheah ................. H01L 23/564 |
| 2019/0057289 | A1* | 2/2019 | Bauer ................. G09F 3/0297 |
| 2019/0272501 | A1 | 9/2019 | Pauline |
| 2020/0125909 | A1* | 4/2020 | Teitelbaum ...... G06K 19/07762 |

FOREIGN PATENT DOCUMENTS

| | | |
|---|---|---|
| KR | 101753142 B1 * | 7/2017 |
| WO | WO2020224574 | 11/2020 |

OTHER PUBLICATIONS

Novadis; Novadis Launched Cost-Effective Heat Sealing RFID Tags for Secure, Permanent Tagging of Apparel; Jul. 29, 2013; https://veryfields.net/heat-sealing-rfid-tags-permanent-rfid-tagging-of-apparel.

Fujitsu; Fujitsu Begins Worldwide Sales of UHF-Band RFID Tags for Garment Management; JCN Newswire-Japan Corporate News Network; Tokyo, May 12, 2008; https://dialog.proquest.com/professional/docview/467525315/176FD4A1B5B7518897D/1?accountid=157282.

ZB Tech; RFID Laundry Tag Used for Identification and Anti-Counterfeiting; Feb. 12, 2021; https://rfidntag.com/rfid-laundry-tag/.

Smiley; RFID Laundry Tags-Attachment and Use; Apr. 9, 2020; https://www.atlasrfidstore.com/rfid-insider/rfid-laundry-tags-attachment-and-use/.

* cited by examiner

A.- T-SHIRT

B.- NFC
1"

C.- (2) NFC COATING
1 1/4"

D.- Polyurethane Vinyl (First Layer)
1 3/8"

E.- Polyurethane Vinyl (Second Layer)
1 3/4"

F.- Heat Transfer $(D+B+C^2)$

300°F - 45 Sec.

RADIO-FREQUENCY COMMUNICATION-ENABLED FABRICS AND RELATED METHODS

CROSS-REFERENCE TO RELATED APPLICATION

This application claims the benefit of U.S. Provisional Application No. 63/160,334 filed Mar. 12, 2021, which is hereby incorporated herein in its entirety by reference.

FIELD OF THE INVENTION

The present invention relates to objects having radio-frequency (RF) tags affixed thereto, and more particularly, to garments and other fabric objects having RF tags and related methods of affixation.

BACKGROUND OF THE INVENTION

It is known to apply a label with a machine-readable code (such as a Quick Response (QR) code) to an object to allow a user with a camera-equipped electronic device to capture an image of the code, after which the device automatically analyzes the image to read the code and take some subsequent action based thereon. For instance, the electronic device can display the encoded information to the user, or automatically open a browser or other web-enabled application and display additional information and to the user using a web address contained in the code. While this is useful, this approach still has shortcomings. For example, it can be difficult and time-consuming under certain conditions for the electronic device to capture a sufficiently accurate image of the code to allow successful image analysis. Also, the encoded data cannot be changed after the label is printed. Additionally, the QR or other code can be a visually unappealing addition to many objects.

In another field, radio-frequency identification (RFID) tags are affixed to many objects, which tags can be quickly and reliably read with an active reader device. While such tags are applied to various objects, including fabrics, they are generally used to simply encode information about the associated objects—such as a tracking number or other identifier. For example, it is known to integrate RFID tags into garment labels to allow inventory tracking at the manufacturer and downstream retailers. Laundering or care instructions for the associated garment may also be encoded in the RFID tag. Such tags are, consequently, usually intended to be largely unnoticed by end users and are not placed to facilitate ongoing interactive experiences.

SUMMARY OF THE INVENTION

In view of the foregoing, it is an object of the present invention to provide improved RF-enabled fabrics and related methods of affixation. According to an embodiment of the present invention, an RFID tag configured with a Near Field Communication (NFC) protocol is sealed between water-resistant layers and affixed to a fabric. The NFC-configured tag can be programmed with instructions to automatically direct an electronic device to a web address by which means virtually any additional information can be communicated to the user of the electronic device.

According to a method aspect, the NFC-configured tag is initially sealed between water-resistant layers. A compatible water-resistant layer is affixed to a fabric and then the sealed NFC-configured tag and a further water-resistant cover layer are affixed to the fabric over the previously-affixed compatible layer. The tag is then very securely and permanently affixed to the fabric, with which the tag can be safely subjected to repeated wear and washing.

These and other objects, aspects and advantages of the present invention will be better appreciated in view of the drawings and following detailed description of preferred embodiments.

DETAILED DESCRIPTION OF PREFERRED EMBODIMENTS

Figure 1:
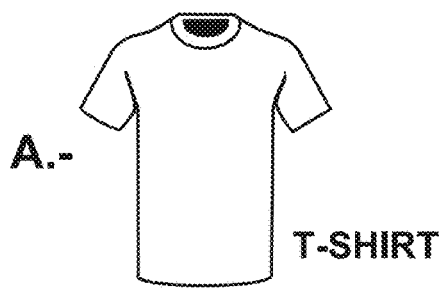
FIG. 1 is an overview of components utilized to assembly an RF-enabled fabric, according to an embodiment of the present invention.
Figure 1:
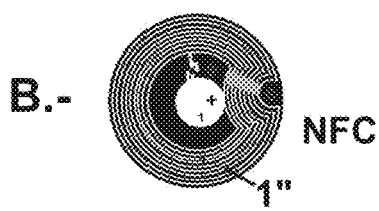
Figure 1:
Figure 1:
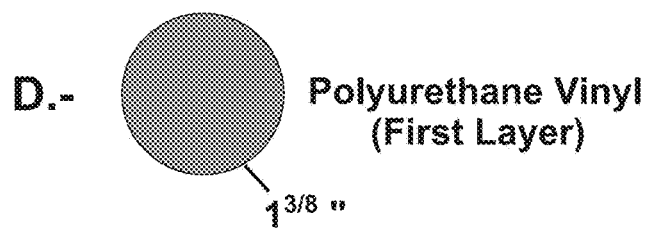
Figure 1:
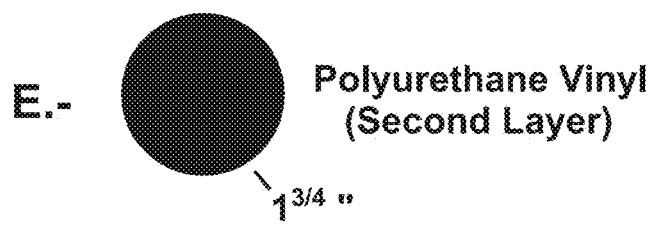
Figure 1:
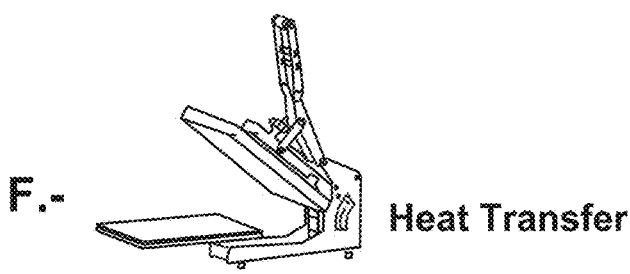

According to an embodiment of the present invention, referred to FIG. 1, in assembling an RF-enabled fabric, a fabric A (such a cotton T-shirt or any other fabric used to form any other garment or fabric object), an RFID tag B (preferably, including an antenna and a chip encoded with NFC protocols suitable for the fabric application), two coating layers C for the tag B (preferably polyurethane vinyl (PV)), a base layer D for the fabric A (preferably also PV), a cover layer E (preferably also PV) and a thermal transfer press F are used. Although the depicted tag B and layers C-E are circular, it will be appreciated that any desired shape could be used, with the cover layer E offering any desired finished appearance.

Figure 2:
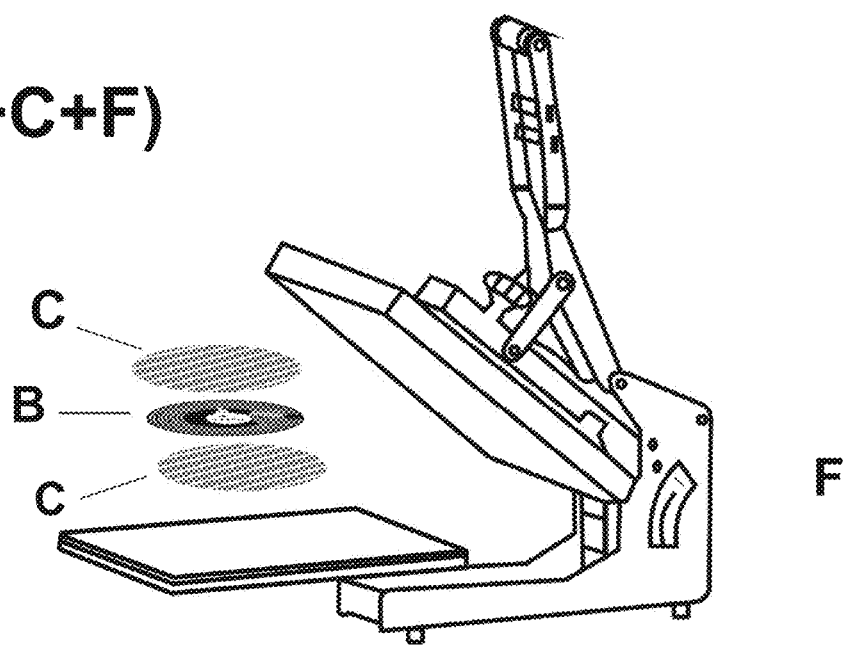
FIGS. 2-9 are overviews of steps of an assembly method utilizing the components of FIG. 1.
Figure 3:
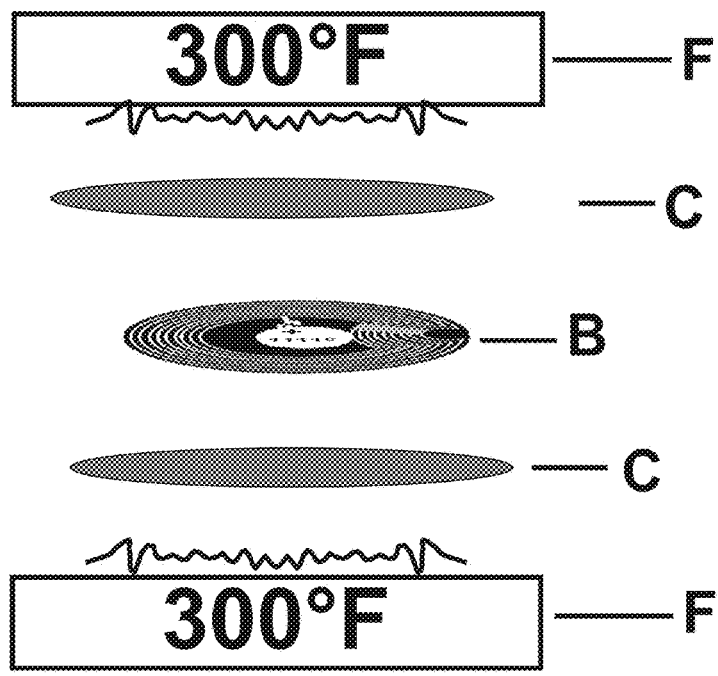

Referring to FIGS. 2 and 3, the tag B is initially sealed between the coating layers C in the press F to waterproof the tag B. Press F time and temperature setpoints in this and subsequent steps are determined based on the particular materials selected.

Figure 4:
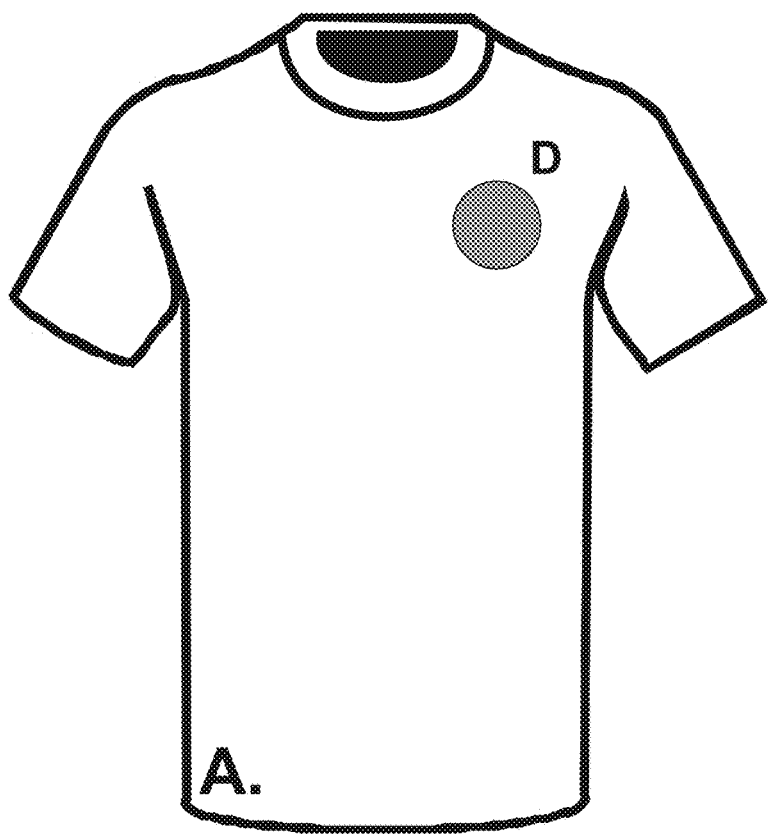
Figure 5:
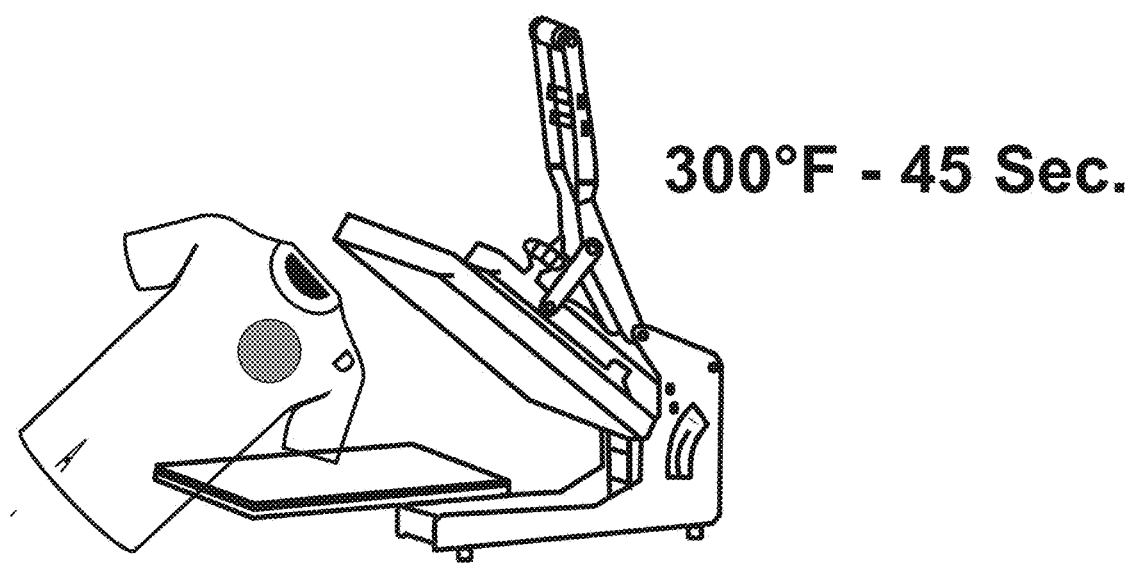
Figure 6:
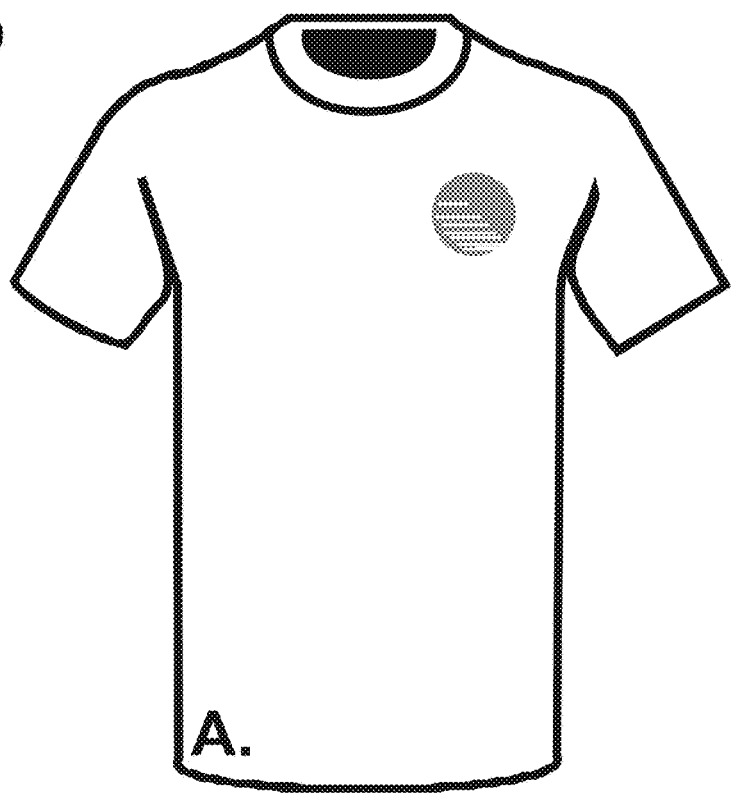
Figure 7:
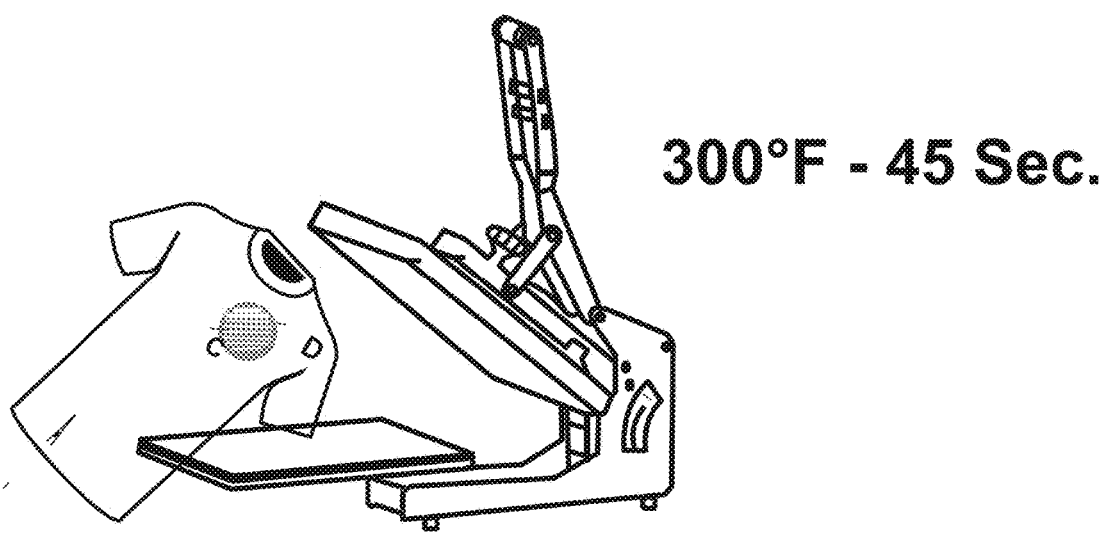

Referring to FIGS. 4 and 5, the base layer D is then affixed to the fabric A using the press F. This provides a compatible base to securely affix the coated tag B to the fabric A, which is done (see FIGS. 6 and 7) using the thermal press F.

Figure 8:
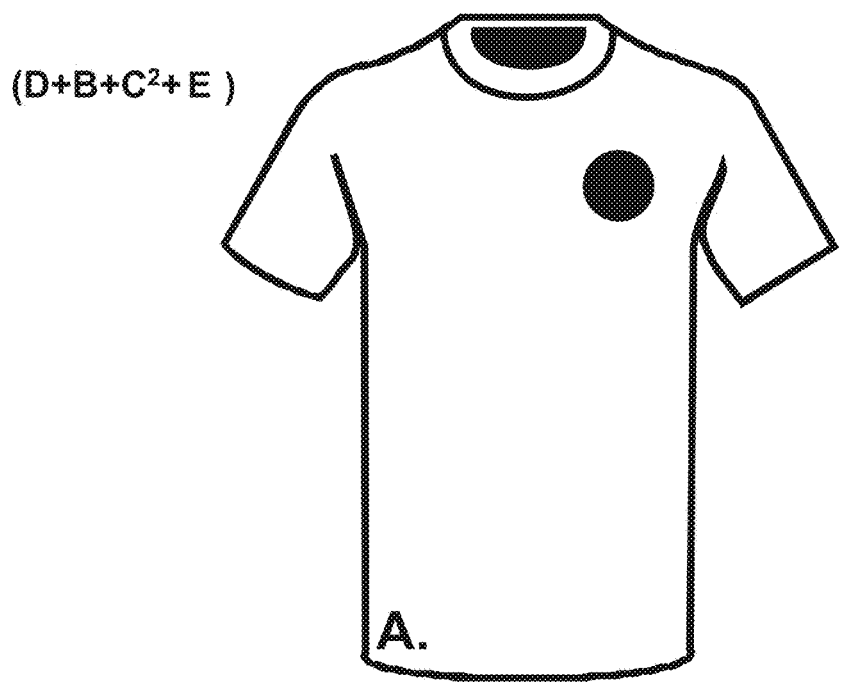
Figure 9:
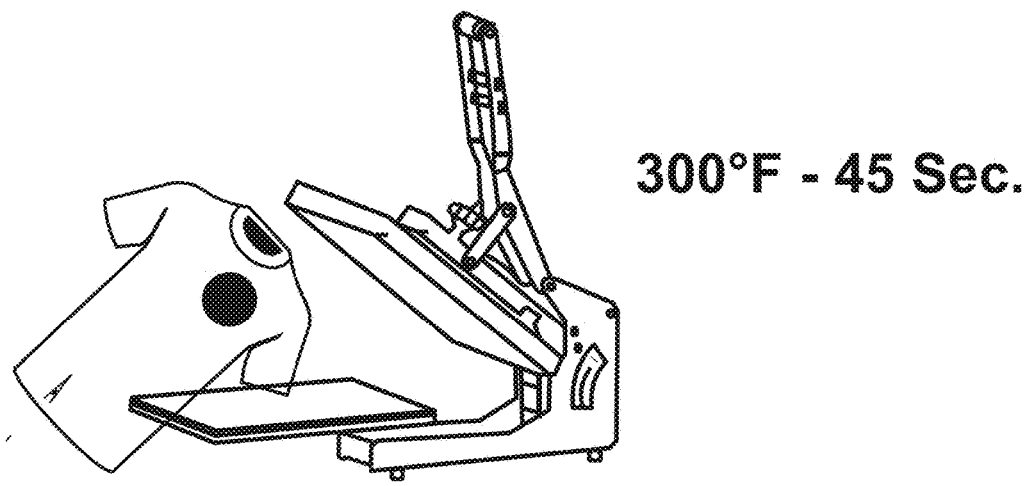

Referring to FIGS. 8 and 9, for additional waterproofing and robustness, the final cover layer E is applied over the now-affixed tag B using the press F. The fabric A is now RF-enabled and ready for subsequent use.

The tag B can be programmed, before and/or after affixation, with any desired web address or other information depending on the desired implementation for the RF-enabled fabric. For example, the programmed tag B could result, upon reading with an electronic device, automatic calling of a specified phone number, automatic messaging to a specified address with a specified message, automatic opening of a specified web page, automatic opening of a mobile app and downloading of a song, game, video or the like, among other possible functions.

It will be appreciated that the resultant RF-enabled fabric is extremely robust and waterproof, can be used a part of any desired garment or other fabric object, allows for nearly instantaneous and reliable reading of programmed information, and offer a nearly unlimited range of interactive opportunities as a result. However, the foregoing embodiment is provided for illustrative and exemplary purposes; the present invention is not necessarily limited thereto. Rather those skilled in the art will further appreciated that various modifications, as well as adaptations to particular circumstances, will fall within the scope of the invention as herein shown and described.

What is claimed is:

1. A method of making a radio-frequency communication-enabled fabric, the method comprising:
   sealing a radio-frequency identification (RFID) tag between a pair of waterproof coating layers;
   affixing a base layer to a fabric;
   affixing the sealed RFID tag to the base layer on the fabric; and
   applying a cover layer over the sealed RFID tag after affixing to the base layer on the fabric.

2. The method of claim 1, wherein the RFID tag includes an antenna and a chip encoded with Near Field Communication (NFC) protocols.

3. The method of claim 1, wherein heat sealing is used for sealing the RFID tag between the coating layers, affixing the base layer to the fabric, affixing the RFID tag to the base layer and applying the cover layer.

4. The method of claim 3, wherein the coating layers, the base layer and the cover layers are all polyurethane vinyl.

5. The method of claim 3, wherein a thermal press is used for the heat sealing.

6. The method of claim 5, wherein the heat sealing is performed at 300 degrees Fahrenheit.

7. The method of claim 1, further comprising programming the RFID tag with information which, upon reading the RFID tag with a compatible electronic device, will result in at least one of:
   automatically calling a specified phone number;
   automatically messaging a specified address with a specified message;
   automatically opening a specified web page; and
   automatically opening a mobile application.

8. The method of claim 1, wherein the RFID tag is programmed with information which, upon reading the RFID tag with a compatible electronic device, will result in automatically opening a mobile application and further in downloading of at least one of: a song, a game and a video.

9. The method of claim 1, wherein the fabric is part of a garment.

10. The method of claim 9, wherein the garment is a shirt.

11. The method of claim 10, wherein sealed RFID tag is affixed to a front of the shirt.

12. The method of claim 9, wherein the cover layer results in a different finished appearance to the front of the shirt.

13. A radio-frequency communication-enabled fabric comprising:
   a fabric;
   a base layer affixed to the fabric;
   a radio-frequency identification (RFID) tag sealed between a pair of waterproof coating layers and affixed to the base layer; and
   a cover layer affixed over the RFID tag and the pair of waterproof coating layers;
   wherein the base layer, the pair of waterproof coating layers and the cover layer are all heat sealed; and
   wherein the base layer, the pair of waterproof coating layers and the cover layer are all polyurethane vinyl.

14. The fabric of claim 13, wherein the RFID tag includes an antenna and a chip encoded with Near Field Communication (NFC) protocols.

15. The fabric of claim 14, wherein the RFID tag is programmed with information which, upon reading the RFID tag with a compatible electronic device, will result in at least one of:
   automatically calling a specified phone number;
   automatically messaging a specified address with a specified message;
   automatically opening a specified web page; and
   automatically opening a mobile application.

16. The fabric of claim 15, wherein the fabric is part of a garment.

17. The fabric of claim 16, wherein the garment is a shirt.

18. The fabric of claim 17, wherein the RFID tag is affixed to a front of the shirt.

* * * * *